US012177395B2

(12) United States Patent
Hasegawa (10) Patent No.: US 12,177,395 B2
(45) Date of Patent: Dec. 24, 2024

(54) IMAGE READING APPARATUS AND IMAGE FORMING APPARATUS

(71) Applicant: CANON KABUSHIKI KAISHA, Tokyo (JP)

(72) Inventor: Bungo Hasegawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/506,924

(22) Filed: Nov. 10, 2023

(65) Prior Publication Data

US 2024/0171691 A1 May 23, 2024

(30) Foreign Application Priority Data

Nov. 17, 2022 (JP) .................................. 2022-183875

(51) Int. Cl.
*H04N 1/00* (2006.01)
*H04N 1/04* (2006.01)

(52) U.S. Cl.
CPC ..... *H04N 1/00557* (2013.01); *H04N 1/00538* (2013.01); *H04N 1/00551* (2013.01); *H04N 1/0461* (2013.01); *H04N 2201/0446* (2013.01)

(58) Field of Classification Search
CPC ........... H04N 1/00538; H04N 1/00551; H04N 1/00557; H04N 1/0461; H04N 2201/0446
USPC ............................................... 358/1.11–1.18
See application file for complete search history.

(56) References Cited

U.S. PATENT DOCUMENTS

| 5,602,650 A * | 2/1997 | Tamura | H04N 1/1215 |
| | | | 358/473 |
| 2017/0339294 A1* | 11/2017 | Fukushima | H04N 1/00737 |
| 2020/0382667 A1* | 12/2020 | Suto | H04N 1/00557 |
| 2021/0144269 A1* | 5/2021 | Sakuma | H04N 1/00798 |
| 2021/0377415 A1* | 12/2021 | Hasegawa | H04N 1/00795 |

FOREIGN PATENT DOCUMENTS

| JP | 11052268 A | * | 2/1999 |
| JP | 2017208745 A | | 11/2017 |

\* cited by examiner

*Primary Examiner* — Chad Dickerson
(74) *Attorney, Agent, or Firm* — Canon U.S.A., Inc. IP Division (57) ABSTRACT

An image reading apparatus includes a reading unit, a cable, a connector portion, a casing, and a cover member. The reading unit reads an image of a document. The cable is connected to the reading unit, and transmits an image signal output from reading unit. The connector portion is disposed in the reading unit, and is connected to the cable. The casing accommodates the reading unit and has an opening portion through which the connector portion is exposed to outside of the casing. The cover member is attached to and detached from the casing and covers the opening portion in a state where the cable is connected to the connector portion via the opening portion.

8 Claims, 10 Drawing Sheets

IMAGE READING APPARATUS AND IMAGE FORMING APPARATUS

BACKGROUND

Field

The present disclosure relates to an image reading apparatus that reads an image of a document, and an image forming apparatus including the image reading apparatus.

Description of the Related Art

Typical image forming apparatuses, such as copying machines and facsimile machines, are known to include image reading apparatuses having a reading unit that optically read images of documents. This type of image reading apparatus also includes an automatic document feeder (ADF) that conveys documents one by one, and a scanner unit for reading an image of the conveyed document.

Japanese Patent Application Laid-Open No. 2017-208745 discusses a configuration in which an image reading apparatus is provided with a reading unit (image reading sensor) including a light receiving element for reading an image of a document. In a case where a foreign object enters an area between this reading unit and a document conveyance path, a linear image streak may appear in read image information. Thus, in the Japanese Patent Application Laid-Open No. 2017-208745, a reading unit is sealed by sealing members in order to prevent a foreign object from entering the inside.

In the above noted typical image forming apparatuses, a cable for transmitting an image signal of a read document to a control circuit board is connected to the reading unit. However, in a case where the typical image forming apparatus reading unit is accommodated in a casing, a connector portion to which the cable is to be connected is located inside the casing. Thus, when the cable is attached to and detached from the connector portion in assembly and maintenance of the reading unit, the reading unit is removed from the casing, and thus a foreign object may enter the inside of the casing.

SUMMARY

The present disclosure is directed to providing an image reading apparatus and an image forming apparatus that are capable of preventing entrance of a foreign object into a casing when a cable is attached to or detached from a reading unit accommodated in the casing.

According to an aspect of the present disclosure, an image reading apparatus includes a reading unit configured to read an image of a document, a cable configured to be connected to the reading unit, and to transmit an image signal output from reading unit, a connector portion disposed in the reading unit, and configured to be connected to the cable, a casing that accommodates the reading unit and has an opening portion through which the connector portion is exposed to outside of the casing, and a cover member configured to be attached to and detached from the casing and cover the opening portion in a state where the cable is connected to the connector portion via the opening portion.

Further features of the present disclosure will become apparent from the following description of exemplary embodiments with reference to the attached drawings.

DESCRIPTION OF THE EMBODIMENTS

An exemplary embodiment of the present disclosure will be described below with reference to the accompanying drawings. However, the following exemplary embodiment is merely an example that embodies the present disclosure and does not limit the technical scope of the present disclosure.

<Configuration of Image Forming Apparatus>

Initially, a schematic configuration of an image forming apparatus 101 of the present exemplary embodiment will be described with reference to FIG. 1.

Figure 1:
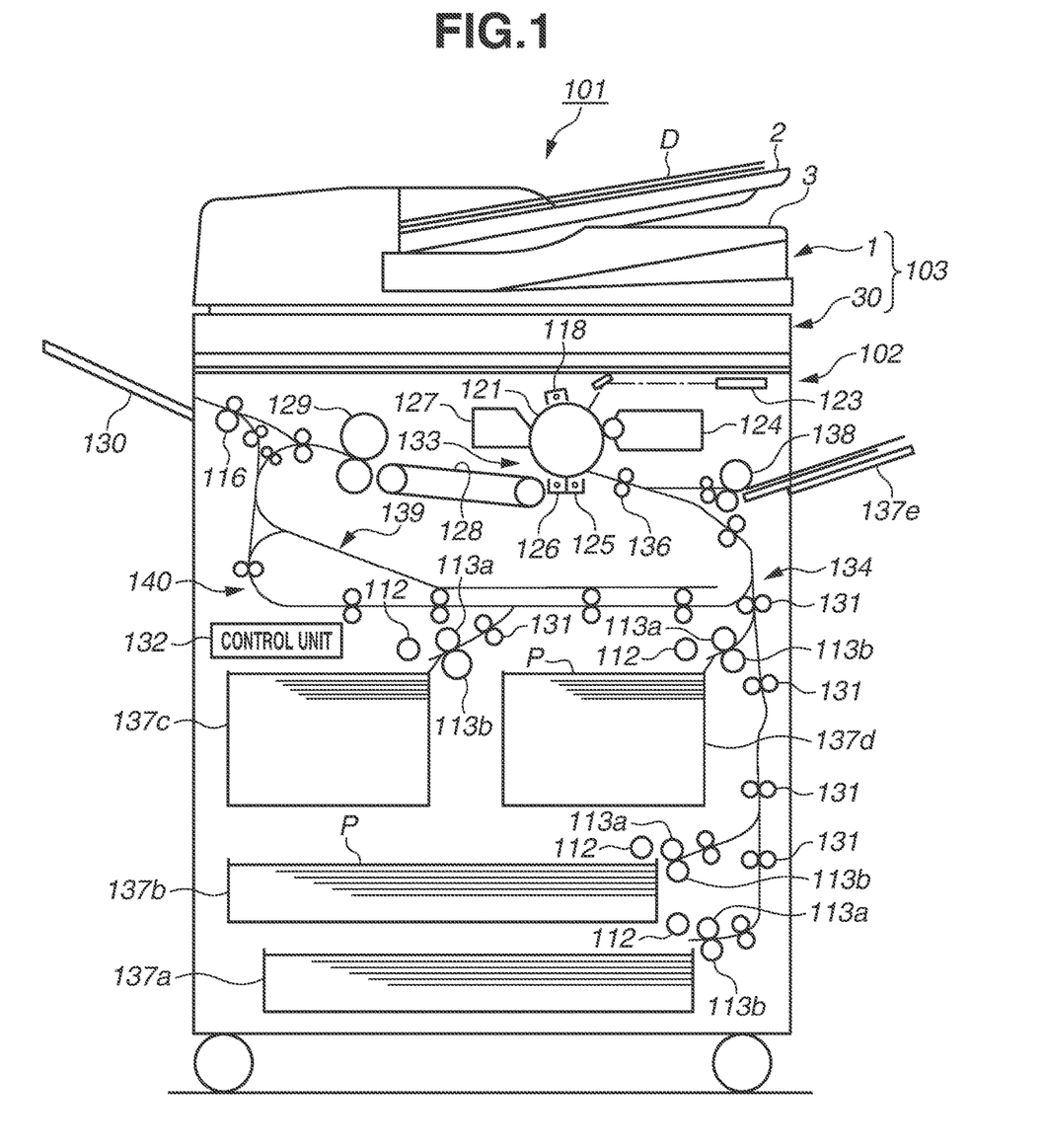
FIG. 1 is a schematic sectional view of an image forming apparatus.

FIG. 1 is a schematic sectional view of the image forming apparatus 101. The image forming apparatus 101 has a configuration in which an image reading apparatus 103 is disposed over an image forming apparatus main body 102, as illustrated in FIG. 1.

The image reading apparatus 103 includes a scanner unit 30 and an automatic document feeder (ADF) 1, and reads image information by optically scanning a document D. The document D is a sheet, such as a paper sheet or an envelope, a plastic film such as an overhead projector (OHP) sheet, or a cloth. The image information converted into electric signals by the image reading apparatus 103 is transferred to a control unit 132 disposed in the image forming apparatus main body 102.

The image forming apparatus main body 102 includes an image forming unit 133 serving as an image forming unit that forms an image on a sheet P which is a print medium, and a sheet feeding unit 134 that feeds the sheet P to the image forming unit 133. The sheet feeding unit 134 includes sheet storage units 137*a*, 137*b*, 137*c*, and 137*d* that can each store the sheets P of a size different from those in other units. The sheets P stored in each of these sheet storage units are fed by a pickup roller 112, and separated one by one by a feed roller 113*a* and a retard roller 113*b*, and are then delivered to a corresponding conveyance roller pair 131. The sheets P are sequentially conveyed to the plurality of conveyance roller pairs 131 arranged along a sheet conveyance path, and then conveyed to a registration roller pair 136.

The sheet P placed on a manual feed tray 137*e* by a user is fed by a feeding roller 138 to the inside of the image forming apparatus main body 102 and then conveyed to the registration roller pair 136. The registration roller pair 136 stops the leading end of the sheet P and corrects skew. Further, the registration roller pair 136 resumes the conveyance of the sheet P in synchronization with the progress of an image forming operation, which is a toner-image forming process and is performed by the image forming unit 133.

The image forming unit 133 that forms an image on the sheet P is an electrophotographic-type image forming unit including a photosensitive drum 121 that is a photosensitive member. The photosensitive drum 121 is rotatable along the conveyance direction for the sheet P, and a charging device 118, an exposure device 123, a development device 124, a transfer charger 125, a separation charger 126, and a cleaner 127 are arranged around the photosensitive drum 121. The charging device 118 uniformly charges the surface of the photosensitive drum 121. The exposure device 123 exposes the photosensitive drum 121 with light based on image information input from the image reading apparatus 103 or the like, thus forming an electrostatic latent image on the photosensitive drum 121. The development device 124 contains developer including toner, and develops the electrostatic latent image into a toner image by supplying the charged toner to the photosensitive drum 121. The toner image carried on the photosensitive drum 121 is transferred by a bias electric field formed by the transfer charger 125 to the sheet P conveyed from the registration roller pair 136. The sheet P to which the toner image has been transferred is separated from the photosensitive drum 121 by a bias electric field formed by the separation charger 126, and then conveyed toward a fixing unit 129 by a pre-fixing conveyance portion 128. The cleaner 127 removes an adhering substance, such as transfer residual toner which remains on the photosensitive drum 121 without being transferred to the sheet P, and the photosensitive drum 121 prepares for the next image forming operation.

The sheet P conveyed to the fixing unit 129 is subjected to a fixing process including pressing and heating of the toner image, while being conveyed by a pair of rollers. The toner is thereby melted and subsequently hardens, so that the image is fixed to the sheet P. In a case where image output is completed, the sheet P where the fixed image is formed is discharged to a discharge tray 130 that outwardly protrudes from the image forming apparatus main body 102, via a discharge roller pair 116. In a case where an image is to be formed on the back side of the sheet P in two-sided printing, the sheet P that has passed through the fixing unit 129 is turned upside down by a reversing unit 139, and then conveyed to the registration roller pair 136 by a two-sided conveyance portion 140.

The sheet P on which the image is formed again by the image forming unit 133 is discharged to the discharge tray 130.

In the present exemplary embodiment, the image forming apparatus 101 includes the electrophotographic-type image forming unit, but the image forming unit is not limited thereto and may be other types of image forming units, such as an inkjet type.

<Configuration of Image Reading Apparatus>

Figure 2:
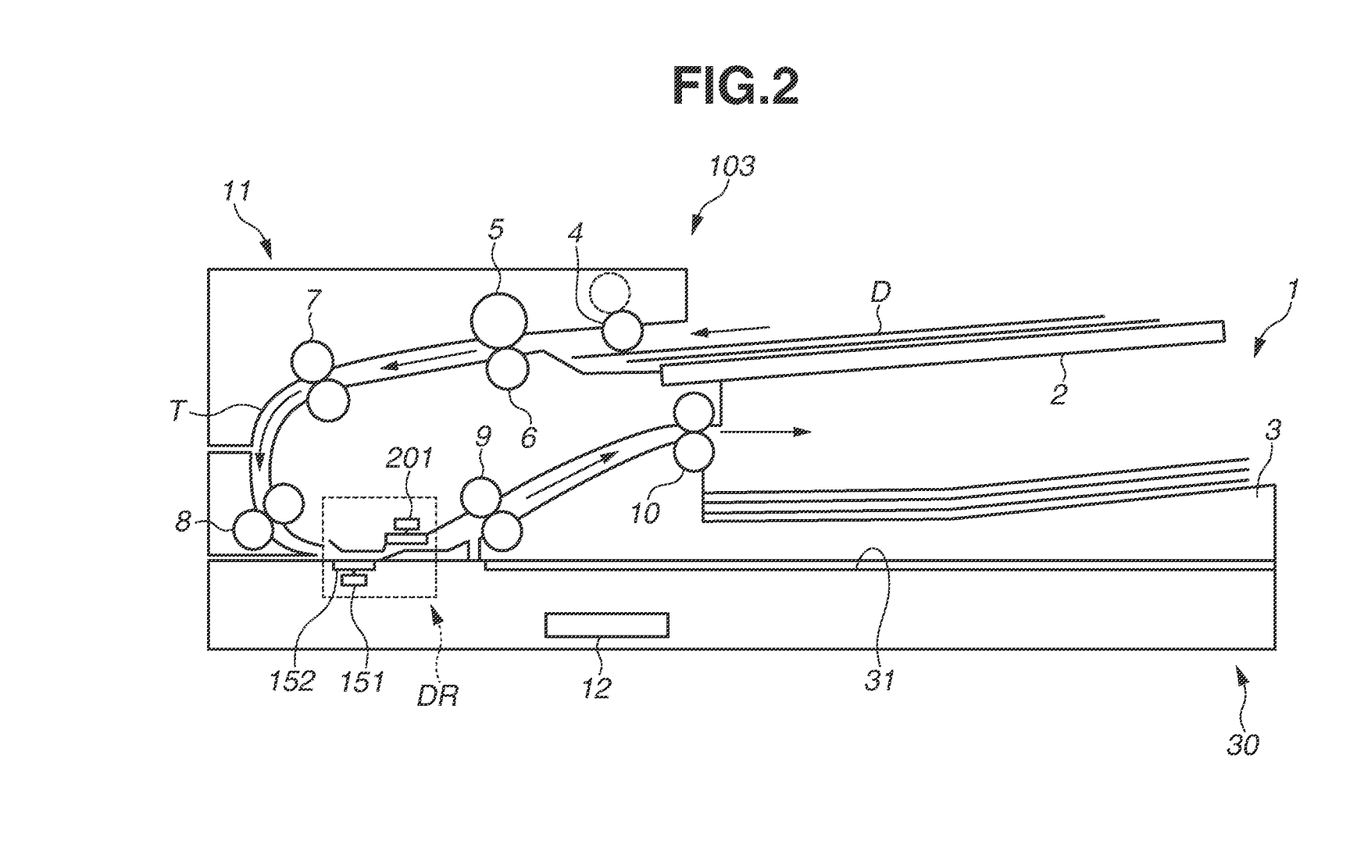
FIG. 2 is a schematic sectional view of an image reading apparatus.

Next, a configuration of the image reading apparatus 103 will be described with reference to FIG. 2. The image reading apparatus 103 includes the scanner unit 30 and the ADF 1, as illustrated in FIG. 2. The image reading apparatus 103 includes a first reading unit 151 disposed inside the scanner unit 30 and a second reading unit 201 disposed inside the ADF 1. Each element of the image reading apparatus 103 will be described below.

The first reading unit 151 reads image information from a first surface of the document D. The second reading unit 201 reads an image of a second surface, which is opposite to the first surface, of the document D. The first surface in the present exemplary embodiment is the lower surface of the document D in a two-sided reading unit DR, and the second surface is the upper surface of the document D in the two-sided reading unit DR. The first reading unit 151 and the second reading unit 201 are included in the two-sided reading unit DR that can simultaneously read the two sides of the document D conveyed by the ADF 1. The two-sided reading unit DR does not always simultaneously read the two sides, and can also read only one side.

The first reading unit 151 and the second reading unit 201 each include a contact image sensor (CIS) that is a scanning device employing an equal-magnification optical system. The first reading unit 151 and the second reading unit 201 each include a light source including a light emitting diode (LED) array arranged in a main scanning direction orthogonal to the conveyance direction for the document D, and a plurality of light receiving elements arranged similarly in the main scanning direction. Light emitted from the LED array and then reflected by the document D is focused on each of the light receiving elements via a lens, and the reflected light is photoelectrically converted by the light receiving element.

The scanner unit 30 is fixed to the upper part of the image forming apparatus main body 102 (see FIG. 1). A flatbed-type transparent platen 31 is disposed on the top surface of the scanner unit 30, as illustrated in FIG. 2. The first reading unit 151 is movable in a sub scanning direction (the lateral direction in FIG. 2) by a drive unit (not illustrated), and moves along the platen 31 over the entire length of the platen 31, from a predetermined position (a position illustrated in FIG. 2) in the two-sided reading unit DR. A control circuit board 12 for controlling the image reading apparatus 103 is disposed in the scanner unit 30. The control circuit board 12 is connected to the control unit 132 of the image forming apparatus main body 102, processes image information read by the first reading unit 151 and the second reading unit 201, and transmits the processed information to the control unit 132.

The ADF 1 is supported by a hinge mechanism (not illustrated) disposed on the rear side in FIG. 2, to be capable of opening and closing with respect to the scanner unit 30 in the vertical direction. The ADF 1 includes a document tray 2 and a document conveyance portion 11, in addition to the second reading unit 201. The document tray 2 supports the document D placed by the user. On the document tray 2, the document D is placed in a state where the first surface faces upward. A document conveyance path T is formed inside the document conveyance portion 11, and the document conveyance portion 11 feeds the document D placed on the document tray 2 to the two-sided reading unit DR via the document conveyance path T.

Next, the document conveyance portion 11 will be described in detail. The document conveyance portion 11 includes a pickup roller 4, a feed roller 5, a retard roller 6, a registration roller pair 7, conveyance roller pairs 8 and 9, and a discharge roller pair 10 in this order along the conveyance direction (indicated by arrows in FIG. 2) for the document D. The pickup roller 4 is movable in the vertical direction with respect to the top surface of the document tray 2, and is brough into contact with the document D to start feeding the document D on the document tray 2. The feed roller 5 conveys the document D received from the pickup roller 4 toward the downstream side of the conveyance direction. The retard roller 6 is pressed by the feed roller 5, and driven to rotate in a direction against the conveyance direction via a torque limiter, and the retard roller 6 separates, one by one, the documents D conveyed by the feed roller 5.

The registration roller pair 7 receives the conveyance direction downstream end (leading end) of the document D conveyed by the feed roller 5, and deflects the document D to correct skew, in a state where the rotation is stopped. The registration roller pair 7 conveys the document D for which skew has been corrected, via a warp portion of the document conveyance path T, to pass the document D to the conveyance roller pair 8. The conveyance roller pair 8 sends the document D into the two-sided reading unit DR, to pass the document D to the conveyance roller pair 9 on the downstream side. In this process, the first reading unit 151 and the second reading unit 201 each read the image of the document D. The conveyance roller pair 9 passes the document D having passed through the two-sided reading unit DR to the discharge roller pair 10. The discharge roller pair 10 discharges the document D to a discharge tray 3.

The image reading apparatus 103 thus configured reads image information from the document D, in a flowing document reading mode in which the document D is scanned while the document D is being fed by the ADF 1, and a fixed-document reading mode in which the document D placed on the platen 31 is scanned. The flowing document reading mode is selected in a case where a device detects the document D placed on the document tray 2, or in a case where the user explicitly issues an instruction using an operation panel or the like of the image forming apparatus main body 102. In such cases, in a state where the first reading unit 151 is at the predetermined position of the two-sided reading unit DR, the ADF 1 feeds the documents D toward the two-sided reading unit DR one by one. Each of the first reading unit 151 and the second reading unit 201 in the case of two-sided simultaneous reading, or one of these units in the case one-sided reading, scans the document D by emitting scanning light to the document D. The image information converted into electric signals by the light receiving elements is transferred to the control unit 132 of the image forming apparatus main body 102 via the control circuit board 12.

In contrast, the fixed-document reading mode is selected in a case where a device detects the document D placed on the platen 31 or in a case where the user explicitly issues an instruction using the operation panel or the like of the image forming apparatus main body 102. In such cases, the first reading unit 151 scans the document D placed on the platen 31 while emitting light and moving along the platen 31. The image information converted into electric signals by the light receiving elements of the first reading unit 151 is transferred to the control unit 132 of the image forming apparatus main body 102 via the control circuit board 12.

<Configuration of Casing Accommodating Reading Unit>

Figure 3:
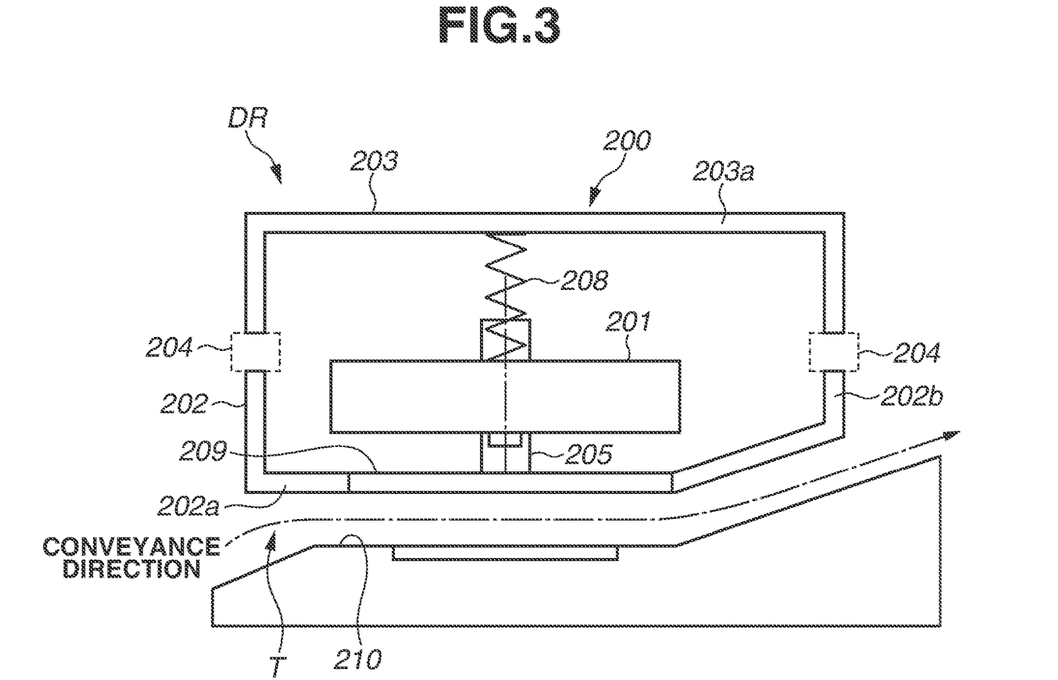
FIG. 3 is a sectional view of a second reading unit and a casing.

Next, a casing 200 accommodating the second reading unit 201 will be described. FIG. 3 is a sectional view of the second reading unit 201 and a portion therearound in the two-sided reading unit DR. The second reading unit 201 is accommodated in a state of being sealed inside the casing 200, as illustrated in FIG. 3. The casing 200 is an example of an accommodating portion in the present exemplary embodiment. The casing 200 includes a transparent portion 209 that allows light emitted from the second reading unit 201 to the document and light heading toward the second reading unit 201 upon being reflected by the document to pass therethrough. In the two-sided reading unit DR, a part of the document conveyance path T is formed by the transparent portion 209, and a conveyance guide 210 disposed at a position facing the transparent portion 209.

Meanwhile, to convey the document D to the two-sided reading unit DR, each roller pair that conveys the document D is under a predetermined pressure in a direction (a sheet thickness direction) perpendicular to the sheet conveyance direction. The document conveyance path T has a warp shape as illustrated in FIG. 2. Thus, in a process in which the document D is conveyed, paper powder is produced as the rollers rub against the surfaces of the document D, and the produced paper powder floats inside the ADF 1. Depending on the usage environment of the apparatus, dust and the like can enter the ADF 1. These unwanted particles will be hereinafter referred to as "floating particles".

In a case where such a floating particle enters the space between the image reading surface of the second reading unit 201 and the transparent portion 209, the light emitted from the second reading unit 201 can be blocked, which may result in occurrence of an image streak in the read image information. Further, because the second reading unit 201 is present inside the ADF 1, it is difficult for the user to clean the particle present in the space between the image reading surface of the second reading unit 201 and the transparent portion 209. Thus, a serviceperson is to be called in some cases. For this reason, a configuration in which floating particles do not enter the space between the second reading unit 201 and the transparent portion 209 is desirable. Thus, in the present exemplary embodiment, the second reading unit 201 is sealed by the casing 200 and a cover member 220 (described below) without a space, so that floating particles are prevented from entering the space between the second reading unit 201 and the transparent portion 209.

Next, a configuration of the casing 200 accommodating the second reading unit 201 will be described with reference to FIG. 3 to FIG. 7. FIG. 7 is an exploded perspective view of the second reading unit 201, a first case member 202, and a second case member 203. The casing 200 includes the first case member 202 that covers the second reading unit 201 from the document conveyance path T side, and the second case member 203 that accommodates the second reading unit 201 in cooperation with the first case member 202, as illustrated in FIG. 3 and FIG. 7. The first case member 202 and the second case member 203 are each made of a resin material, such as polyacetal or polyamide. The first case member 202 is supported by the document conveyance portion 11 (housing) of the ADF 1. The first case member 202 serving as a first accommodating member includes the transparent portion 209 that faces the conveyed document D and allows light emitted from the light source of the second reading unit 201 to pass therethrough. The first case member 202 includes a guide portion 202a forming the document conveyance path T together with the transparent portion 209 and the conveyance guide 210, and a side surface 202b that is a surface perpendicular to the transparent portion 209 and surrounds the second reading unit 201 from the main scanning direction and the sub scanning direction. In the present exemplary embodiment, the first case member 202 holds the transparent portion 209, but the entire first case member 202 may be formed of a transparent material such as transparent resin.

The second case member 203 serving as a second accommodating member accommodates the second reading unit 201 in cooperation with the first case member 202 with an elastic member 204 therebetween. The second case member 203 includes a top surface 203a that is parallel with the transparent portion 209, and covers the second reading unit 201 from the side opposite to the document conveyance path T. The second case member 203 is disposed to overlap the first case member 202 from above, and fixing portions 203b and 203c of the second case member 203 are fixed to fixing portions 202c and 202d of the first case member 202 by screw or the like.

A protrusion portion 214 is disposed at each of both ends of the second reading unit 201 in the main scanning direction. A groove portion 215 is formed at each of both ends of the first case member 202 in the main scanning direction. The protrusion portion 214 of the second reading unit 201 fits in the groove portion 215 of the first case member 202, so that the second reading unit 201 is positioned in the main scanning direction and the sub scanning direction in the accommodating space of the casing 200.

Between the top surface 203a of the second case member 203 and the second reading unit 201, an urging member 208, such as a spring, for urging the second reading unit 201 toward the transparent portion 209 is disposed (see FIG. 3). The second reading unit 201 is positioned in the gravity direction by the urging force of the urging member 208, and configured so that the focal depth range of the second reading unit 201 corresponds to the height of the document conveyance path T. Thus, the second reading unit 201 is reliably focused on the conveyed document D, thus enhancing image reading accuracy.

Figure 4:
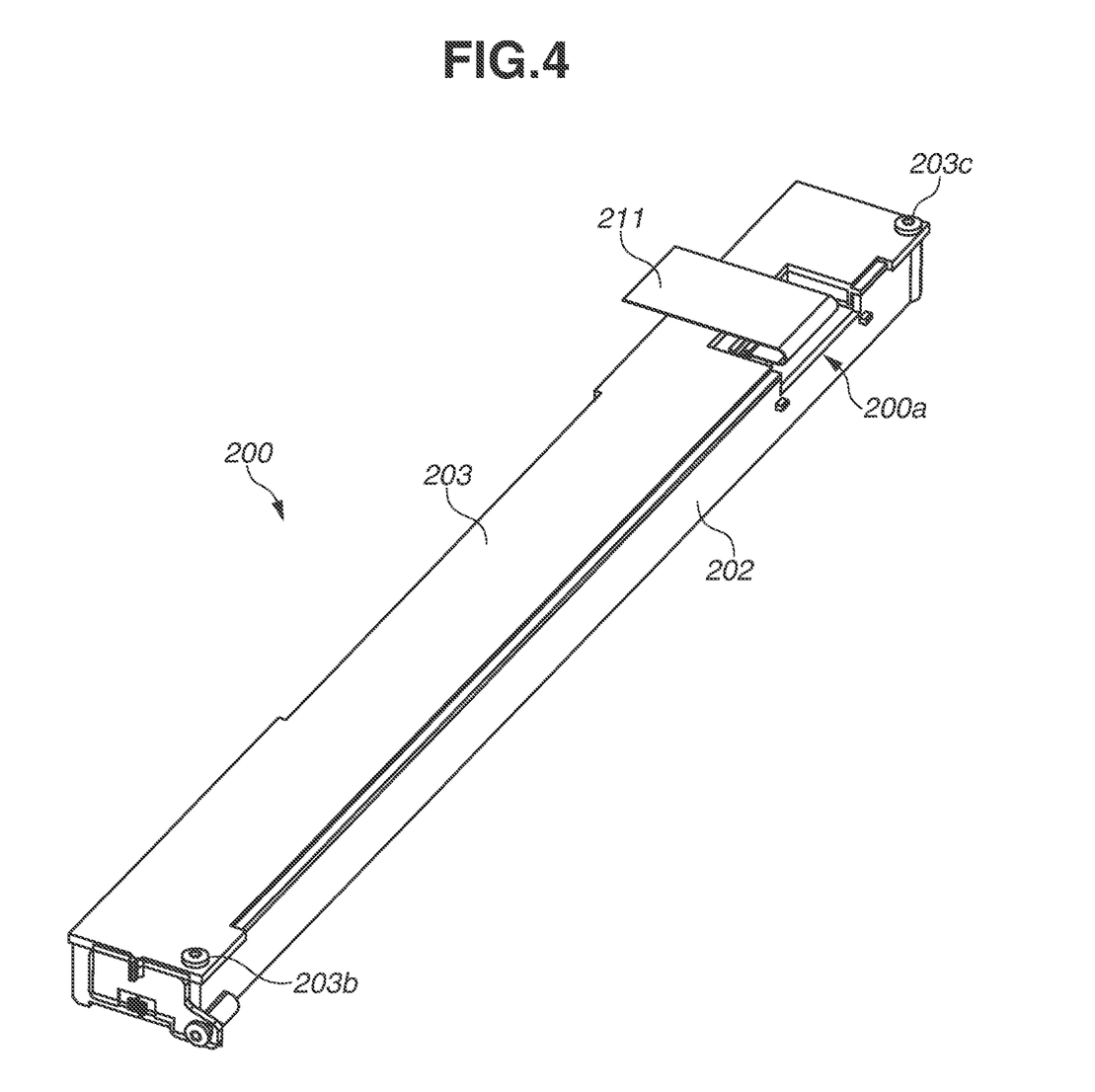
FIG. 4 is a perspective view of the casing in a state where a flat cable is connected to the second reading unit.

FIG. 4 is a perspective view of the second reading unit 201 to which a flat cable 211 is connected and the casing 200. The flat cable 211 for transmitting image signals of the document D read by the second reading unit 201 to the control circuit board 12 is connected to the second reading unit 201, as illustrated in FIG. 4. The second reading unit 201 includes a connector portion 213 to which one end of the flat cable 211 is connected. In other words, the flat cable 211 has one end connected to the connector portion 213 of the second reading unit 201, and the other end connected to the control circuit board 12 disposed in the scanner unit 30.

Figure 5:
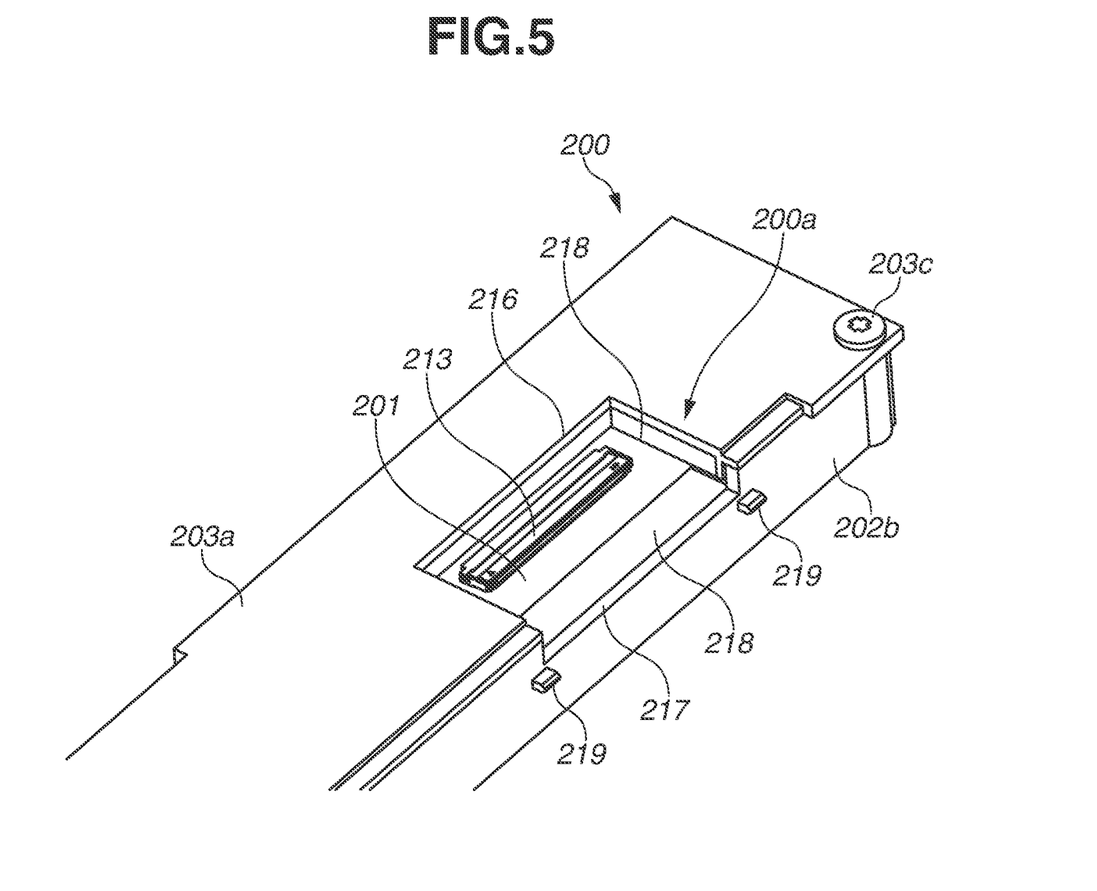
FIG. 5 is a perspective view of a connector portion of the second reading unit.

FIG. 5 is a perspective view of the connector portion 213 of the second reading unit 201 in a state where the flat cable 211 is removed. The casing 200 includes an opening portion 200a for exposing the connector portion 213 of the second reading unit 201 to the outside of the casing 200, as illustrated in FIG. 5. The opening portion 200a is an opening (a hollow portion) formed by connecting a cutout portion 217 in the side surface 202b of the first case member 202 and a cutout portion 216 in the top surface 203a of the second case member 203. In other words, the opening portion 200a is formed to be continuous with the side surface 202b and the top surface 203a in the casing 200. The flat cable 211 is inserted into the connector portion 213 from the direction (the sub scanning direction) perpendicular to the side surface 202b where the opening portion 200a is formed. In other words, the opening portion 200a is formed so that the connector portion 213 is open in the insertion/removal direction of the flat cable 211 and a direction perpendicular to the insertion/removal direction. In this way, the opening portion 200a is formed to be continuous with an area including the side surface 202b, so that a worker can easily connect the flat cable 211 to the connector portion 213 and remove the flat cable 211 from the connector portion 213.

Figure 6:
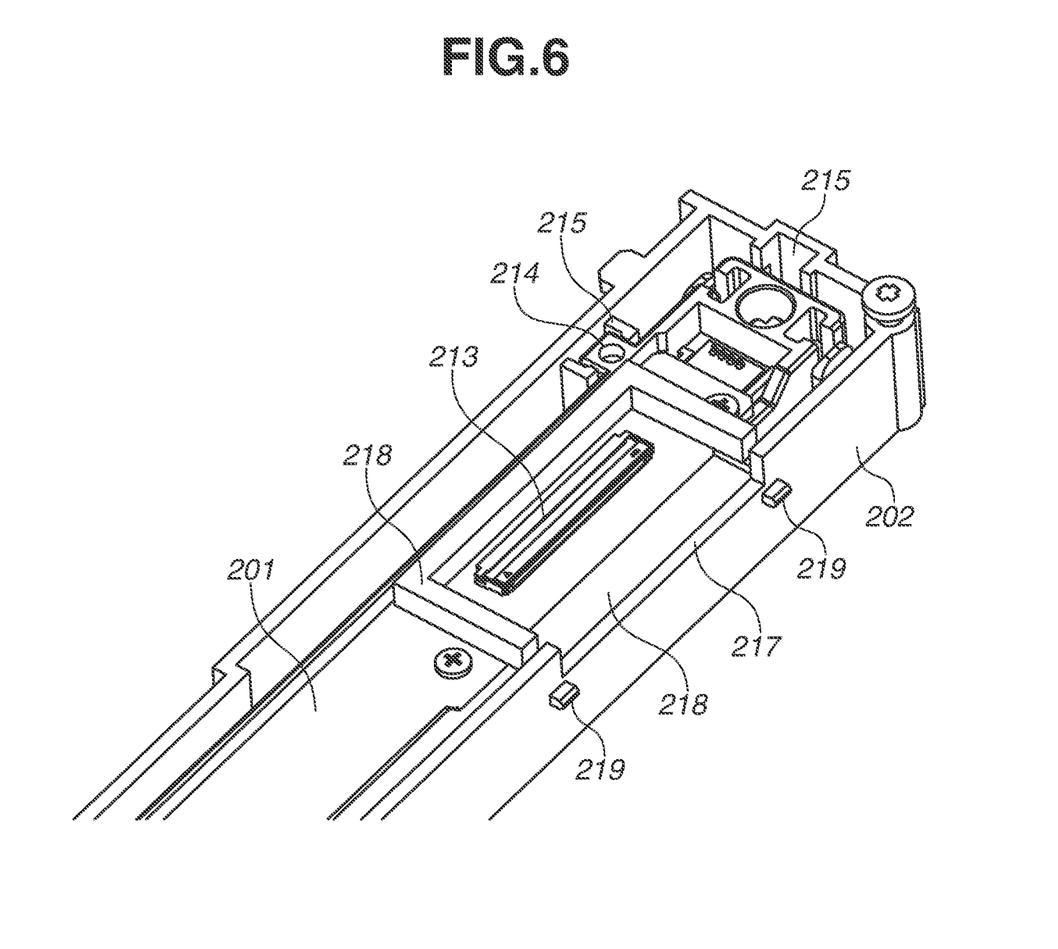
FIG. 6 is a perspective view of the connector portion of the second reading unit.
Figure 7:
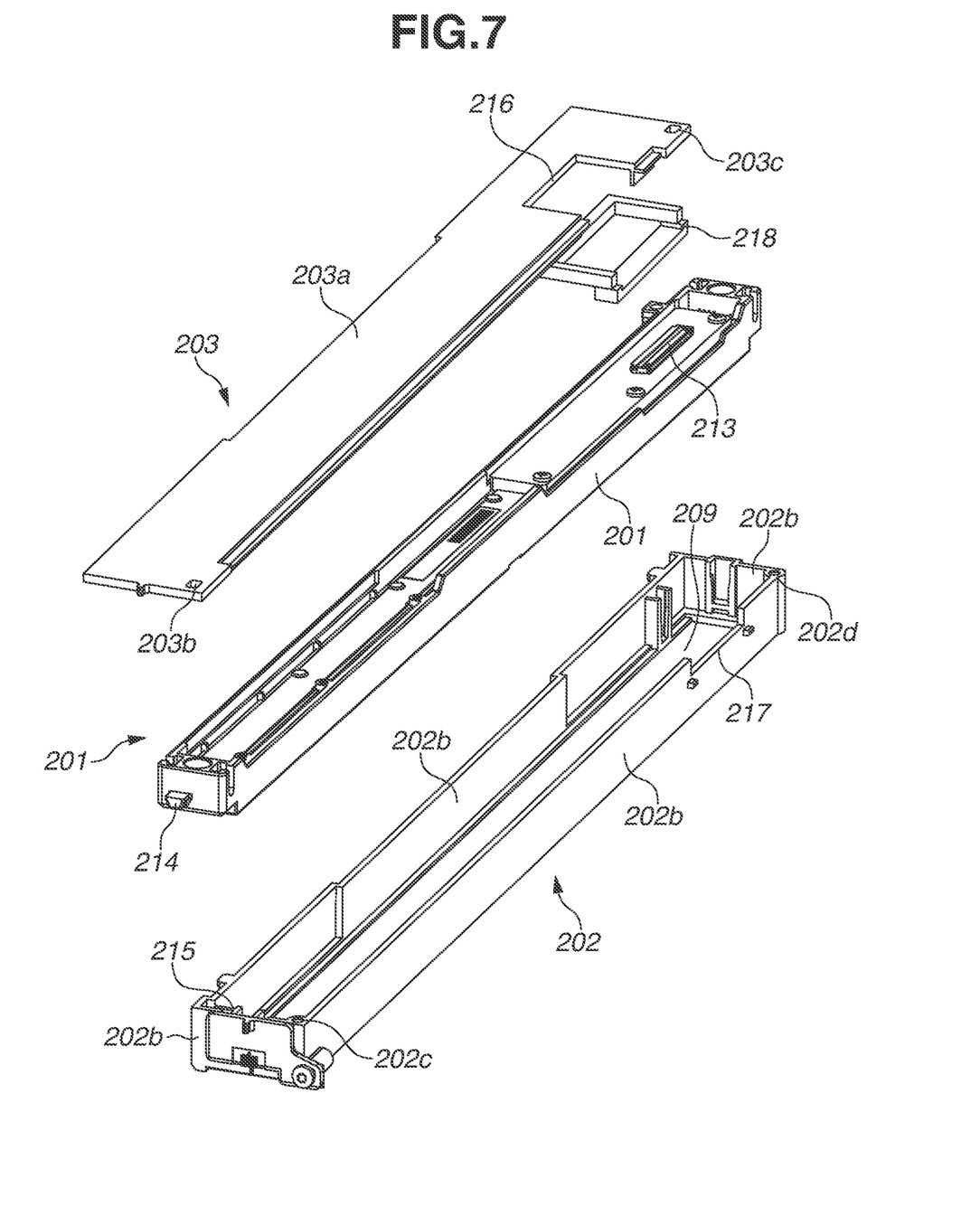
FIG. 7 is an exploded perspective view illustrating the second reading unit, a first case member, and a second case member.

FIG. 6 is a perspective view of the connector portion 213 of the second reading unit 201 in a state where the second case member 203 is removed. An elastic member 218 is disposed along the periphery of the opening portion 200a formed in the casing 200 as illustrated in FIG. 5 and FIG. 6. The elastic member 218 has a shape following the shape of the cutout portion 217 of the side surface 202b and the shape of the cutout portion 216 of the top surface 203a, and is configured not to cover the connector portion 213 even in a state where the second reading unit 201 is accommodated in the casing 200.

The elastic members 204 and 218 are each made of a foam material including a urethane system or a foam material including ethylene propylene rubber, and are disposed to fill the space between the first case member 202 and the second case member 203. The elastic members 204 and 218 are pressed by the first case member 202 and the second case member 203, in a state where the casing 200 accommodates the second reading unit 201. The elastic members 204 and 218 thus configured are capable of preventing entrance of unwanted particles into the casing 200 from the space between the first case member 202 and the second case member 203 and from the opening portion 200a. The elastic members 204 and 218 may be disposed in either one of the first case member 202 and the second case member 203, or may be disposed in both of these members. In the present exemplary embodiment, the elastic members 204 and 218 are configured as a plurality of divided elastic members, but may be configured as a single elastic member.

Figure 8:
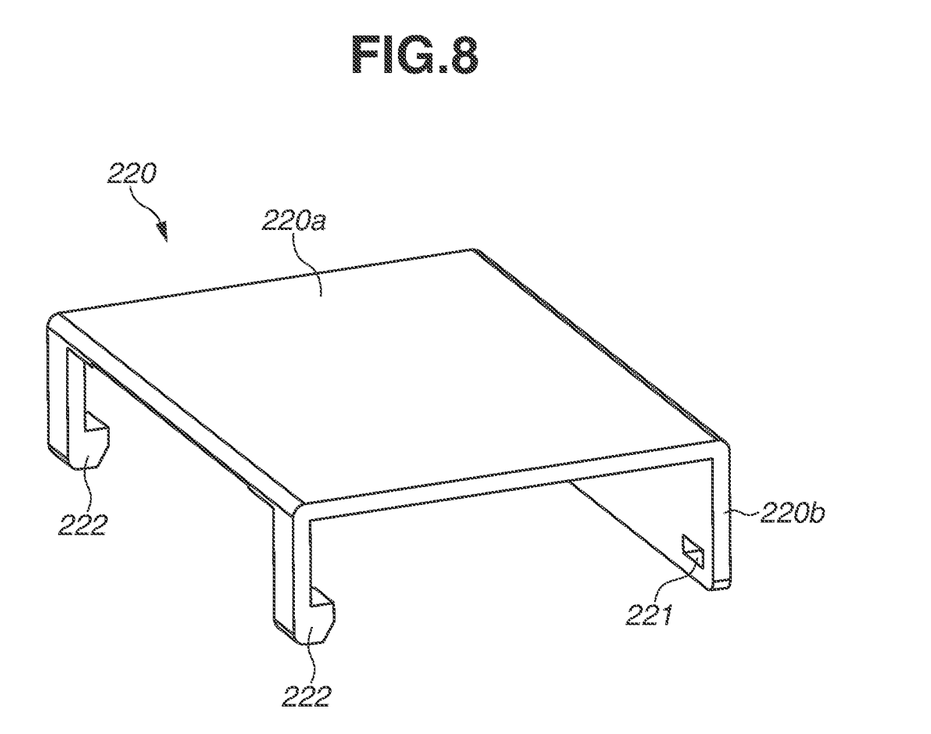
FIG. 8 is a perspective view of a cover member.
Figure 9:
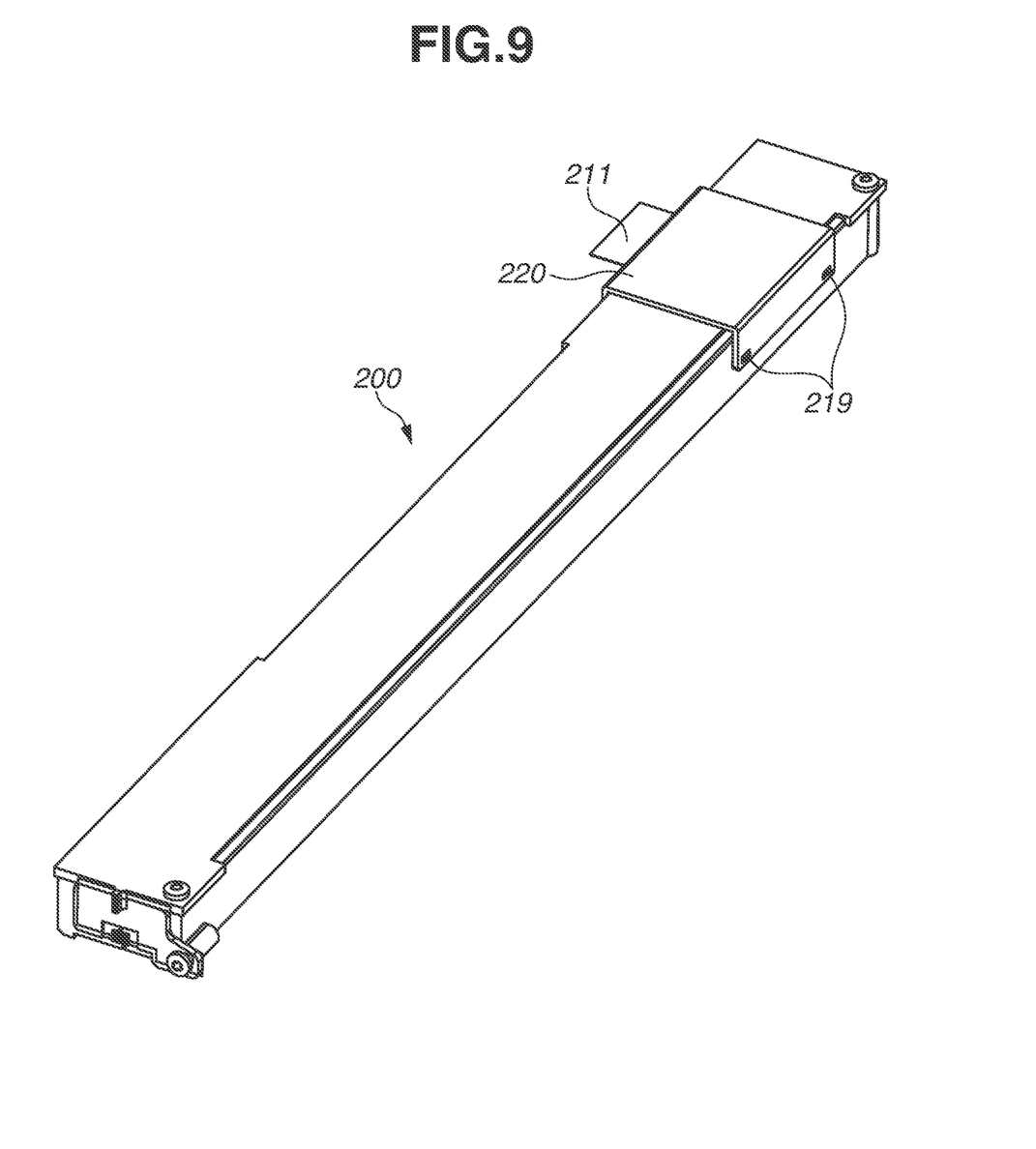
FIG. 9 is a perspective view illustrating a state where the cover member is attached to the casing.
Figure 10:
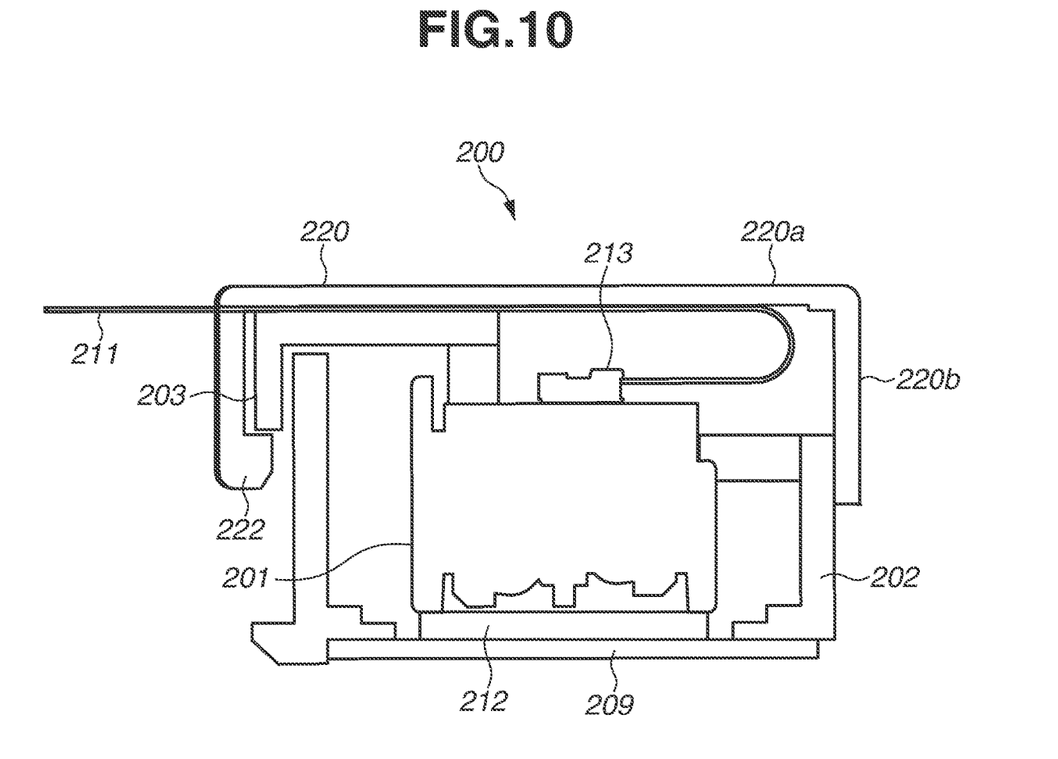
FIG. 10 is a sectional view illustrating the state where the cover member is attached to the casing.

Next, the cover member 220 that covers the opening portion 200a formed in the casing 200 will be described with reference to FIG. 8 to FIG. 10. FIG. 8 is a perspective view of the cover member 220. FIG. 9 is a perspective view of the casing 200 in a state where the cover member 220 is attached thereto, and FIG. 10 is a sectional view of the casing 200 in the state where the cover member 220 is attached thereto, and the second reading unit 201.

The cover member 220 that covers the opening portion 200a is attached to the casing 200 in the present exemplary embodiment. The cover member 220 is detachably attached to the casing 200 in a state where the flat cable 211 is connected to the connector portion 213 via the opening portion 200a. The cover member 220 includes a first cover surface 220a, a second cover surface 220b extending vertically from the first cover surface 220a, and two engagement projections 222 extending vertically from the first cover surface 220a and located opposite the second cover surface 220b. In the state where the cover member 220 is attached to the casing 200, the first cover surface 220a covers the cutout portion 216 of the top surface 203a, and the second cover surface 220b covers the cutout portion 217 of the side surface 202b.

Two engagement holes 221 that are through holes and spaced apart in the main scanning direction are formed in the second cover surface 220b. The two engagement projections 222 are spaced apart in the main scanning direction. In each of the engagement projections 222, a projection portion projecting toward the second cover surface 220b is formed on the side opposite to the first cover surface 220a.

Two protrusions 219 outwardly protruding from the casing 200 are formed on the side surface 202b of the first case member 202 as illustrated in FIG. 4 and FIG. 5. In the state where the cover member 220 is attached to the casing 200, the protrusions 219 fit in the respective engagement holes 221. Further, in the state where the cover member 220 is attached to the casing 200, the two engagement projections 222 are engaged with an edge portion of the second case member 203, as illustrated in FIG. 10. Thus, the cover member 220 is attached to the casing 200 to cover the opening portion 200a.

Here, since the two engagement projections 222 are spaced apart in the main scanning direction, the flat cable 211 connected to the connector portion 213 can be routed to the outside of the casing 200 through the space between the two engagement projections 222. More specifically, the flat cable 211 connected to the connector portion 213 is bent inside the casing 200, and is disposed along the first cover surface 220a of the cover member 220, as illustrated in FIG. 10. Further, the flat cable 211 is guided out from the casing 200 in the sub scanning direction along the first cover surface 220a.

As described above, the casing 200 that accommodates the second reading unit 201 in the present exemplary embodiment includes the opening portion 200a that exposes the connector portion 213 to the outside of the casing 200. The cover member 220 is attached to the casing 200 to cover the opening portion 200a. This makes it possible for a worker to attach the flat cable 211 to the connector portion 213, by only attaching/detaching the cover member 220. This eliminates the need to leave the casing 200 open in assembly and maintenance, so that entrance of a foreign object into the casing 200 is prevented.

Furthermore, the elastic member 218 is disposed in the casing 200 in the present exemplary embodiment, along the periphery of the opening portion 200a. This makes it possible to prevent entrance of a foreign object from the opening portion 200a, when the cover member 220 is detached from the casing 200.

In the above-described exemplary embodiment, the casing 200 that accommodates the second reading unit 201 is described, but a similar casing 200 may be used to accommodate the first reading unit 151. Further, the image reading apparatus 103 may be configured to include only one of the first reading unit 151 and the second reading unit 201.

According to the present disclosure, it is possible to provide an image reading apparatus and an image forming apparatus that are capable of preventing entrance of a foreign object into a casing when a cable is attached to and detached from a reading unit accommodated in the casing.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-183875, filed Nov. 17, 2022, which is hereby incorporated by reference herein in its entirety.

What is claimed is:

1. An image reading apparatus comprising:
   a reading unit configured to read an image of a document;
   a cable configured to be connected to the reading unit, and to transmit an image signal output from the reading unit;
   a connector portion disposed in the reading unit, and configured to be connected to the cable;
   a casing that accommodates the reading unit and has an opening portion through which the connector portion is exposed to outside of the casing; and
   a cover member configured to be attached to and detached from the casing and cover the opening portion in a state where the cable is connected to the connector portion via the opening portion.

2. The image reading apparatus according to claim 1, further comprising an elastic member disposed along periphery of the opening portion.

3. The image reading apparatus according to claim 1,
   wherein the casing includes a transparent portion configured to allow light from the document to pass through the transparent portion, a side surface perpendicular to the transparent portion, and a top surface parallel with the transparent portion, and
   wherein the opening portion is continuous with the side surface and the top surface.

4. The image reading apparatus according to claim 3, wherein the casing includes a first case member including the transparent portion and the side surface, and includes a second case member including the top surface and accommodating the reading unit in cooperation with the first case member.

5. The image reading apparatus according to claim 3, wherein the cover member includes a first cover surface configured to cover the opening portion, and a second cover surface extending vertically from the first cover surface and configured to cover the opening portion in cooperation with the first cover surface.

6. The image reading apparatus according to claim 1, wherein the casing includes a protrusion portion outwardly protruding from the casing, and the cover member has an engagement hole to be engaged with the protrusion portion.

7. The image reading apparatus according to claim 1, further comprising a document feeder that includes a document tray on which a document is to be placed, and a conveyance portion configured to convey the document placed on the document tray to the reading unit.

8. An image forming apparatus comprising:
   an image reading apparatus that includes:
   a reading unit configured to read an image of a document,
   a cable configured to be connected to the reading unit, and to transmit an image signal output from the reading unit,
   a connector portion disposed in the reading unit, and configured to be connected to the cable,
   a casing that accommodates the reading unit and has an opening portion through which the connector portion is exposed to outside of the casing, and
   a cover member configured to be attached to and detached from the casing and cover the opening portion in a state where the cable is connected to the connector portion via the opening portion; and
   an image forming unit configured to form an image on a sheet, based on the image of the document read by the reading unit.

* * * * *